United States Patent
Welcher

[15] 3,649,221
[45] Mar. 14, 1972

[54] PRODUCTION OF THIOCYANOGEN

[72] Inventor: Richard Parke Welcher, Old Greenwich, Conn.

[73] Assignee: American Cyanamid Company, Stamford, Conn.

[22] Filed: May 15, 1968

[21] Appl. No.: 729,338

[52] U.S. Cl. ................................. 23/357, 23/359
[51] Int. Cl. ........................... C01b 21/54, C01b 31/00
[58] Field of Search ........................ 23/357, 359, 151

[56] References Cited

UNITED STATES PATENTS 3,047,363  7/1962  Field et al. ........................ 23/151

Primary Examiner—Oscar R. Vertiz
Assistant Examiner—Hoke S. Miller
Attorney—James H. Laughlin, Jr.

[57] ABSTRACT

Thiocyanogen is generated by introducing a halogen into an aqueous solution of a water-soluble thiocyanate salt having a water-insoluble liquid organic thiocyanogen-solvent admixed therewith, thereby extracting the thiocyanogen into the organic solvent phase as it is formed.

9 Claims, 1 Drawing Figure

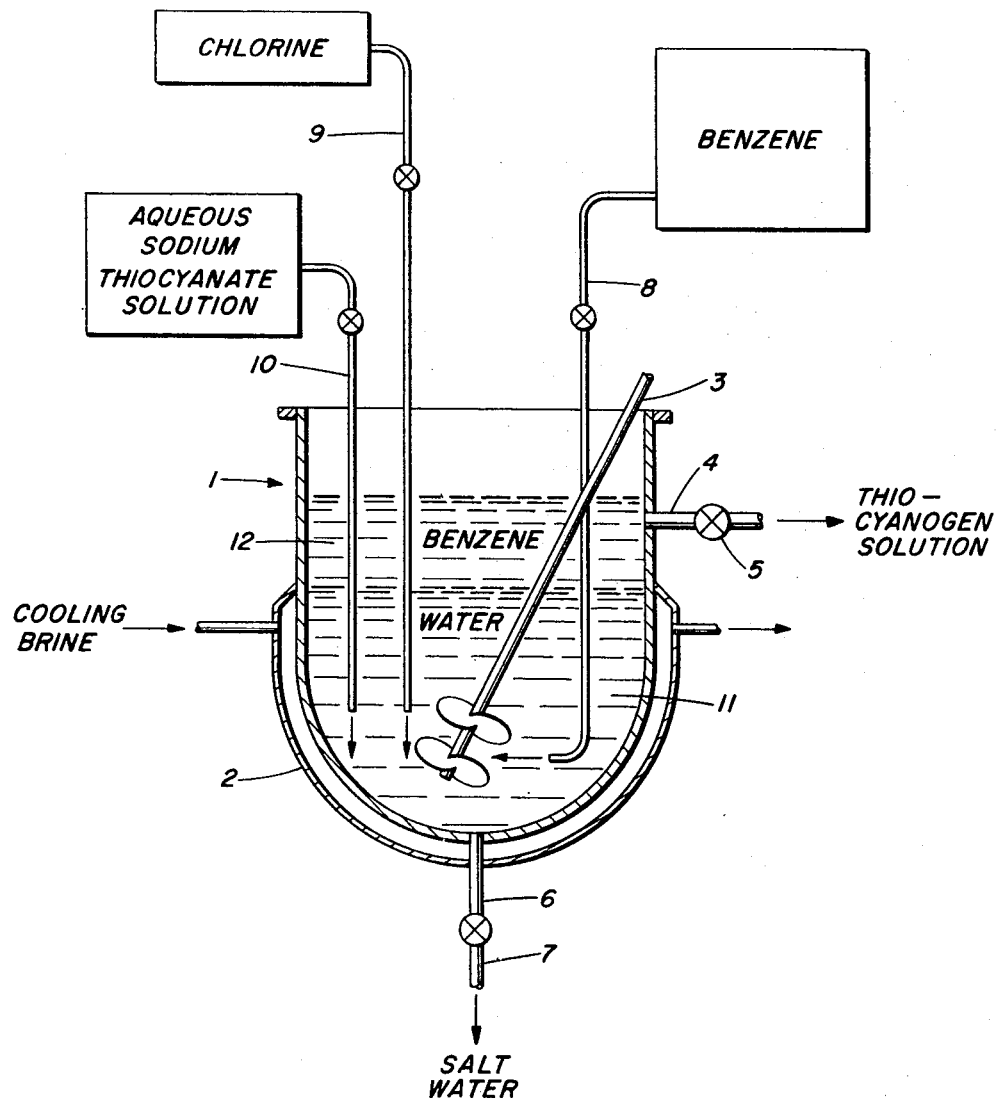

PRODUCTION OF THIOCYANOGEN

This invention relates to a method for the production of thiocyanogen, a compound of the formula $(SCN)_2$ that is used as an analytical reagent and in the production of alkyl and alkylene bis-thiocyanate and aryl monothiocyanate insecticides and germicides. Principal objects of the invention are to provide a method wherein thiocyanogen can be produced at a relatively rapid rate and preferably continuously, and in which it is obtained as a solution in an organic solvent such as benzene or toluene. A further object is to provide a method whereby thiocyanogen can be obtained in high yields by the reaction of an aqueous solution of a water-soluble thiocyanate salt with a halogen while avoiding substantial hydrolysis or polymerization. Still further objects of the invention will become apparent from the following detailed description, when taken with the appended claims.

Heretofore thiocyanogen has been regarded as a highly unstable material. Its sensitivity toward hydrolysis and polymerization is such that it has been liberated in a free condition from thiocyanate salts only in nonaqueous systems, and in most preparations it is produced in situ as it is reacted. Thus in the preparation of a p-thiocyanoaniline a solution of sodium thiocyanate and aniline in methanol is reacted with bromine at low temperatures, thus forming the thiocyanoaniline directly.

My present invention is based on the discovery that thiocyanogen can be obtained in good yields, and with a minimum of hydrolysis and polymerization, by generating it in an aqueous solution of a water-soluble thiocyanate salt provided a water-insoluble liquid organic solvent for thiocyanogen is admixed therewith. I have found that when this is done the thiocyanogen is extracted from the water phase into the organic solvent phase as fast as it is formed, thus protecting the product thiocyanogen from hydrolysis or polymerization. Since thiocyanogen is liberated from aqueous thiocyanate salt solutions by the action of halogens at a much faster rate than can be obtained at low temperatures in a nonaqueous organic solvent system, the process of my invention is well adapted for commercial-scale production.

Although any water-soluble thiocyanate salt may be used as a starting material in the process of the invention the inorganic salts such as the alkali metal, ammonium and alkaline earth metal thiocyanates are preferred for a number of practical reasons. All of these inorganic thiocyanates are very water soluble, and can therefore be used as concentrated aqueous solutions; the importance of this will subsequently be explained. Furthermore, all of these thiocyanates form water-soluble halides with chlorine, bromine, fluorine and iodine, and the resulting brine solutions assist in the extraction of thiocyanogen into the organic phase.

A wide variety of liquid organic thiocyanogen solvents may be used in the process; in fact, any such solvent may be employed that is water insoluble. As a practical matter, however, hydrocarbon solvents are greatly preferred since thiocyanogen is known to deteriorate in the presence of many solvents of other types such as hydroxylic organic solvents. The preferred organic solvents to be used in practicing the invention are therefore the liquid mononuclear aromatic hydrocarbons such as benzene, toluene, ethyl benzene, ortho-xylene, meta-xylene and the like.

It is an important advantage of the invention that it is well adapted to continuous manufacturing processes. Thus, a halogen such as chlorine can be continuously introduced into an agitated reaction vessel containing water having an alkali metal thiocyanate dissolved therein while an organic solvent such as benzene and additional aqueous thiocyanate solutions are preferably continuously introduced. The thiocyanogen liberated from the alkali metal thiocyanate solution by the oxidizing action of the chlorine is immediately taken up by the benzene or toluene, which forms a supernatant layer that can readily be drawn off and the thiocyanogen recovered if desired.

It is another important advantage that the solutions of thiocyanogen in liquid organic solvents such as benzene, toluene or xylene mixtures, produced by the process of the invention and therefore not necessarily anhydrous, can be reacted effectively with alpha-olefins and acetylenes in the presence of a free radical initiator such as a free radical catalyst or actinic light. Examples of such reactions will be given later. However, processes wherein such thiocyanogen solutions are reacted in this manner are not claimed in the present application as they are a portion of the claimed subject matter of my copending application Ser. No. 729,375 filed concurrently herewith.

The invention will be further described with reference to the accompanying drawing, the single FIGURE of which is a diagrammatic illustration of a reaction vessel in which a continuous process is being carried out. On this drawing reference numeral 1 indicates a reaction kettle which is preferably glass lined, since thiocyanogen is quite corrosive. The kettle 1 is provided with a cooling jacket 2 and an agitator 3 and also with a side discharge line 4 having a valve 5 and a bottom discharge line 6 provided with a valve 7. Benzene or other organic solvent is introduced through a valved inlet pipe 8, which preferably discharges into the propeller 3, and chlorine and sodium thiocyanate solutions are introduced through lines 9 and 10 respectively.

In operation a heel of aqueous sodium thiocyanate solution is charged into the reaction kettle, as is indicated generally by reference numeral 11. Benzene or other water-immiscible solvent is admitted through line 8 as chlorine is introduced through line 9, the agitator 3 being in operation to insure admixture of the organic solvent with the water. Simultaneously, sufficient brine is passed through the jacket 2 to maintain a temperature below 20° C. and preferably below 10° C., since improved yields are obtained at reaction temperatures in the range of about 0° to 10° C. or lower. When a steady state has been established, additional sodium thiocyanate solution is introduced preferably continuously through the line 10.

Thiocyanogen is formed in the aqueous phase by the reaction

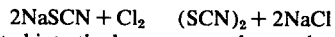

$$2NaSCN + Cl_2 \rightarrow (SCN)_2 + 2NaCl$$

but is extracted into the benzene or toluene phase as fast as it is produced. Because of this continuous and rapid extraction there is very little loss due to polymerization and practically no hydrolysis of the thiocyanogen. The benzene or toluene solution collects as a supernatant organic phase 12 above the water phase 11 and is drawn off through the outlet line 4. Brine solution is preferably continuously withdrawn through the line 6 at a rate roughly equivalent to the rate at which sodium thiocyanate solution is introduced.

The thiocyanate solution produced in this manner may be dried by admixture with any suitable drying agent and passed to storage, since it is known that solutions of thiocyanogen in benzene or toluene are storage stable. If other solvents such as ethyl acetate or carbon tetrachloride are used it is advisable to use the solution more promptly, as thiocyanogen solutions in this type of solvent are less stable.

In practicing the process of my invention, best results are obtained by controlling the amounts of water and organic solvent used. For good results sufficient water should always be present to dissolve the thiocyanate salt completely, as otherwise phase difficulties are encountered. It is also important, however, to form a concentrated solution of alkali metal, ammonium or alkaline earth metal halide, as this assists the rapid and complete extraction of thiocyanogen into the water-immiscible organic solvent. For this reason it is greatly preferable to add the thiocyanate salt as a concentrated aqueous solution, and in general a weight ratio of alkali metal thiocyanate to water should be used that is not greater than about 1.5 to 1 nor less than about 0.3 to 1.

The ratio of water to toluene, benzene or other water-immiscible thiocyanogen solvent should also preferably be controlled. Three parts by weight of the solvent for each part of water is the minimum preferred amount that will produce commercially acceptable yields, and with most solvents the preferred ratio will be within the range of about five to 10 parts by weight of organic solvent for each part of water. When these ratios are maintained the process operates smoothly and the thiocyanogen is recovered in optimum yields.

The invention will be further described and illustrated by the following specific examples, wherein preferred embodiments are given. It will be understood, however, that although these examples may describe some of the more detailed aspects of the invention, they are given primarily as illustrations and the invention in its broader aspects is not limited thereto.

EXAMPLE 1

The reaction kettle 1 was charged with 135 parts by weight of a 60 percent solution of sodium thiocyanate in water which had been cooled to 5° C. The agitator 3 was started and streams of benzene and chlorine were introduced at rates such that about eight to 10 parts by weight of benzene were added for each part of thiocyanogen formed. After about 30 parts by weight of chlorine had been introduced the valve in line 10 was opened and 60 percent aqueous thiocyanate solution was admitted at a rate corresponding to the addition of 2 mols of sodium thiocyanate for each mol of gaseous chlorine ($Cl_2$). The temperature within the kettle was maintained at about 5°–10°C. by circulating cold brine through the cooling jacket.

Thiocyanogen was produced in the water phase by the reaction of chlorine with the aqueous sodium thiocyanate solution but was immediately extracted into and protected by the benzene present. The resulting benzene solution of thiocyanogen rose to the top of the aqueous phase and was withdrawn through side outlet 4.

It will be understood that in this process the benzene can be replaced by corresponding amounts of other water-immiscible liquid thiocyanogen solvents such as toluene, ethylbenzene, ortho-xylene, meta-xylene and other mononuclear aromatic hydrocarbons. Some of these solvents, e.g., toluene, do not separate immediately when dispersed in water at low temperatures and it may therefore be advisable to withdraw a two-phase mixture of thicyanogen-containing solvent and water from the side outlet 4 into a separating tank, where the water can be separated and discharged to waste.

It will also be understood that any water-soluble thiocyanogen salt may be used in the process of this example. Thus, corresponding quantities of ammonium thiocyanate, of any other alkali metal thiocyanate, or of an alkaline earth metal cyanate such as calcium or barium thiocyanate may be substituted. Likewise any other oxidizing agent or reagent known to liberate thiocyanogen from thiocyanates may be introduced as a substitute for gaseous chlorine. Of the halogens, however, chlorine and bromine are preferred; fluorine is too hazardous and iodine is too expensive for practical use.

This method produced thiocyanogen, $(SCN)_2$, in yields of 90–95 percent or better, based on the amount of thiocyanate salt reacted. There is little or no hydrolysis. Losses due to polymerization of thiocyanogen are small when reaction temperatures below about 20° C. are used and are even smaller when temperatures of 10° C. or lower are maintained.

It is an important advantage of the invention that the thiocyanogen is obtained as a solution in an organic solvent, for such solutions can be stored and used later in the manufacture of insecticides and bactericides. For example, they can be used directly to produce 1,2-dithiocyano-ethane, a well-known bactericide, simply by introducing ethylene and irradiating with a mercury vapor lamp.

EXAMPLE 2

The principles of the invention can also be embodied in batch processes. Thus, a mixture of 25 grams of water containing 32.5 grams of sodium thiocyanate and 195 grams of toluene was cooled to 5° C. Cooling was continued while 15.9 grams of bromine were added slowly with stirring, the temperature being maintained at 5°–10° C. When the reaction was complete the mixture was allowed to stand until a solution of thiocyanogen in toluene had separated as a layer above the aqueous sodium bromide solution. This layer was drawn off and there was obtained 21.4 grams of thiocyanogen.

EXAMPLE 3

A glass lined reaction kettle equipped with a cooling jacket and an agitator was charged with a solution of 130 pounds of sodium thiocyanate in 100 pounds of water and 780 pounds of toluene were added. The charge was cooled to 5° C. and maintained at this temperature as 57 pounds of chlorine gas was introduced with agitation.

At this point the mixture in the kettle was yellow and some solid sodium chloride was present, indicating that the water was saturated with this salt. Agitation was then stopped and the water phase separated and drawn off.

Residual chlorine was then removed by flushing with nitrogen after which 1 pound of diisopropyl peroxydicarbonate catalyst, dissolved in toluene, was added. Gaseous acetylene was then introduced, with continued agitation, for about 45 minutes, during which time the temperature was maintained within the range of about 2° to 9° C. Another 1-pound portion of catalyst was then added and the introduction of acetylene was continued at the same temperatures for another 45 minutes. Agitation and acetylene introduction were continued while the batch was allowed to warm slowly to 25° C. The batch was then warmed slowly to 35° C. and held at this temperature for 1 hour, after which it cooled to room temperature.

When the toluene was removed by vacuum evaporation there was obtained a moist-looking orange crystalline solid that melted at 77°–94° C. This was identified as vinylene bisthiocyanate. The wide melting point range and infrared spectrum indicated a mixture of the cis- and trans-isomers. The yield was 73 percent, based on the weight of sodium thiocyanate charged.

Vinylene bisthiocyanate is known to be an effective algicide and bactericide; see U.S. Pat. No. 3,212,963.

Other alkynes may be substituted for acetylene without changing the nature of this process. Typical examples are methyl acetylene or propyne, a gas, and heptyne ($CH:C(CH_2)_4CH_3$) and octyne ($CH:C(CH_2)_5CH_3$) which are colorless liquids. Other monoalkyl acetylenes up to octadecyne ($CH:C(CH)_{16}CH_3$) may be used. Arylacetylenes such as phenylacetylene and diphenylacetylene may also be used.

It will be noted that in the first stage of this process thiocyanogen is produced by the reaction in water solution of a halogen with a dissolved water-soluble thiocyanate salt such as an alkali metal, ammonium, or alkaline earth metal thiocyanate. For good results sufficient water should therefore be present to dissolve the thiocyanate salt completely. It is also important, however, to form a concentrated solution of alkali metal, ammonium or alkaline earth metal halide, as this assists the rapid and complete extraction of thiocyanogen into the toluene or other water-immiscible organic solvent. For this reason it is greatly preferable to add the thiocyanate salt as a concentrated aqueous solution. In general, it is preferred to maintain a weight ratio of alkali metal thiocyanate to water not greater than about 1.5 to 1 nor less than about 0.3:1.

The ratio of water to toluene or other water-immiscible thiocyanogen solvent is also important. Three parts by weight of the solvent for each part of water is the preferred minimum amount that will produce commercially acceptable yields. Optimum proportions will depend on the type of solvent; when benzene, toluene, ortho-xylene, meta-xylene or other liquid mononuclear aromatic hydrocarbons are used they are within the preferred range of three to 10 parts by weight of hydrocarbon for each part of water.

EXAMPLE 4

A glass reaction flask equipped with a stirrer, a thermometer and a gas inlet tube was charged with a mixture of 25 grams of water, 195 grams of toluene and 32.5 grams (0.4 mole) of sodium thiocyanate. The flask was placed in an ice bath and maintained at 5°–10° C. while 15.7 grams (0.222 mole) of gaseous chlorine was introduced with agitation. At this point the reaction mixture was yellow and some solid sodium chloride was present.

The flow of chlorine gas was then shut off and the system was flushed with nitrogen. A solution of 0.52 grams of diisopropyl peroxydicarbonate catalyst in 13 grams of toluene was added in two equal portions 45 minutes apart as gaseous ethylene was passed into the mixture with agitation, the temperature being maintained between 2° and 9° C. After 90 minutes the flow of ethylene was stopped, the ice bath was removed, and the mixture allowed to stand for 3 hours. A total of 4.9 grams of ethylene had been added.

After separating the hydrocarbon solvent layer and removing the solvent there was obtained 23 grams of 1,2-dithiocyanoethane, a bactericide known to be effective against such bacteria as *Aeorbacter aerogenes* and *Pseudomonas aeruginosa*.

A wide variety of monolefin hydrocarbons may be substituted for the ethylene in this process. Thus any alphaolefin of from three to 18 carbon atoms and having the formula

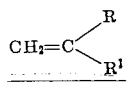

where R is an alkyl radical and $R^1$ is hydrogen or alkyl may be used, such as propylene, 1-butene, isobutylene, 1-amylene, pentylethylene, octylethylene, and the like. Internal olefins, aryl-substituted olefins such as styrene, and cyclic unsaturated hydrocarbons such as cyclopentene, cyclohexene, cyclooctene and terpenes such as beta-pinene may also be used.

What I claim is:

1. A method of producing thiocyanogen which comprises generating thiocyanogen in an aqueous solution of a water-soluble thiocyanate salt having a water-insoluble liquid organic thiocyanogen solvent admixed therewith, thereby extracting the thiocyanogen from the water phase into the organic solvent phase as it is formed, and separating the resulting organic solvent solution from the water phase.

2. A method of producing thiocyanogen by reacting a halogen with a water-soluble thiocyanate salt dissolved in water having a water-insoluble liquid organ thiocyanogen solvent admixed therewith, thereby extracting the thiocyanogen from the water phase into the organic solvent phase as it is formed, and separating the resulting organic solvent solution from the water phase.

3. A method of producing thiocyanogen which comprises generating thiocyanogen by reacting a halogen with a water-soluble thiocyanate salt selected from the group consisting of ammonium thiocyanate, alkali metal thiocyanates and alkaline earth metal thiocyanates, said salt being dissolved in water having a liquid mononuclear aromatic hydrocarbon admixed therewith, thereby extracting the thiocyanogen from the water phase into the hydrocarbon phase as it is formed, and separating from the water phase the resulting solution of thiocyanogen in the hydrocarbon.

4. A method according to claim 3 wherein the weight ratio of the thiocyanate salt to the water is such that a substantially saturated aqueous salt solution is produced.

5. A method according to claim 3 in which the weight ratio of the hydrocarbon solvent to the water is between 3 to 1 and 10 to 1.

6. A method according to claim 3 in which the halogen is chlorine.

7. A method according to claim 3 in which the aromatic hydrocarbon is toluene.

8. A method according to claim 3 in which the thiocyanate salt is sodium thiocyanate.

9. A method according to claim 3 in which the water is maintained at a temperature below 20° C.

* * * * *